United States Patent
Reiser

(10) Patent No.: US 6,558,827 B1
(45) Date of Patent: May 6, 2003

(54) HIGH FUEL UTILIZATION IN A FUEL CELL

(75) Inventor: Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 238 days.

(21) Appl. No.: 09/793,175

(22) Filed: Feb. 26, 2001

(51) Int. Cl.⁷ .............................................. H01M 8/06
(52) U.S. Cl. ...................................................... 429/17
(58) Field of Search ............................. 429/12, 13, 17, 429/22

(56) References Cited

U.S. PATENT DOCUMENTS

| | | |
|---|---|---|
| 6,124,054 A | 9/2000 | Gorman et al. |
| 2002/0127443 A1 * | 9/2002 | Breault .......................... 429/13 |

OTHER PUBLICATIONS

U.S. patent application Ser. No. 09/704,891, Sawyer, filed Nov. 2, 2000.

* cited by examiner

Primary Examiner—Patrick Ryan
Assistant Examiner—Monique Wills
(74) Attorney, Agent, or Firm—M. P. Williams

(57) ABSTRACT

A PEM fuel cell (12) operating on substantially pure hydrogen (32) and air (26) has an exhaust flow control valve (37) at the exit of the anode fuel reactant flow field, said valve being normally closed during steady state low or medium power operation, so that the concentration of nitrogen in the fuel reactant flow fields, by diffusion across the membrane from the cathode, will approach the average concentration of nitrogen in the oxidant, thereby limiting the concentration of hydrogen to a corresponding low complementary amount, which reduces the diffusion of hydrogen across the membrane for consumption at the cathode, thereby increasing the efficiency of operation of the fuel cell. A current sensor (40) allows a controller (46) to open an exhaust flow control valve (37), thereby drawing much higher amounts of hydrogen into the fuel reactant flow field of the anode to support generation of power at high current densities without hydrogen starvation.

11 Claims, 3 Drawing Sheets

HIGH FUEL UTILIZATION IN A FUEL CELL

TECHNICAL FIELD

This invention relates to causing a hydrogen/air fuel cell to utilize substantially all of the fuel reactant in the electrical production process through mitigation of diffusion of the fuel to the cathode side as a result of low fuel concentration on the anode side.

BACKGROUND ART

Consideration is being given to utilization of fuel cells, particularly proton exchange membrane (PEM) fuel cells operating with hydrogen-rich fuel reactant gas and with air as the oxidant gas, for use in vehicles. Since all the fuel must be carried on board the vehicle, and since accessories that may enhance fuel cell performance must nonetheless be powered, electrically, by the fuel cell, thus reducing the overall power plant efficiency, the question of fuel cell efficiency becomes paramount. It is known that fuel cell performance suffers significantly whenever fuel gas is not provided appropriately to the entire surface of the electrolyte. Therefore, it has been a common practice in the prior art to provide excess fuel to the fuel reactant flow fields in order to assure adequate fuel at the anode. However, the higher concentration of hydrogen, which typically may be over 90% at the inlet to the anode fuel flow field, drives the diffusion of the fuel through the membrane where it will react at the cathode with oxygen, thus reducing the efficiency of the electric power generation process. Although PEM fuel cells are attractive for powering vehicles, the proton exchange membrane may be as thin as 15 microns. Since the diffusion rate is inversely proportional to the thickness of the PEM, they suffer from relatively high diffusion of hydrogen through the membrane to the cathode. Hydrogen is also consumed at the anode by reaction with oxygen which diffuses through the membrane from the cathode.

DISCLOSURE OF INVENTION

Objects of the invention include improving fuel consumption in a fuel cell to nearly 100%, and a fuel cell power plant which has the highest possible overall efficiency, taking into account the efficiency of the electric generation process itself and the parasitic loads, such as blowers and pumps and the like, which must be powered by the fuel cell.

The invention is predicated in part on the realization that, in the case of pure hydrogen fuel, for instance, if there is no exhaust (no vent), little diffusion of the hydrogen across the membrane to the cathode, and little diffusion of oxygen to the anode, the hydrogen utilization will, theoretically, approach 100%. The invention is further predicated on the fact that the mode of hydrogen flow management for medium and low power, steady state operation may be different from the mode of hydrogen flow management when the fuel cells are delivering high or peak currents.

According to the present invention, a fuel cell operating on substantially pure hydrogen and air has its anode flow field unvented, whereby the concentration of diffused nitrogen in the anode flow fields will stabilize at about the average concentration of nitrogen in the cathode oxidant (about 85%), thereby reducing the concentration of hydrogen to a sufficiently low level (about 15%–20%) that there is significant reduction in the diffusion of the hydrogen through the proton exchange membrane to the cathode. With no hydrogen exhaust and with reduced diffusion across the PEM, the utilization of hydrogen approaches 98% or greater for current densities exceeding some moderate threshold, such as 0.4 amps/cm$^2$.

According further to the invention, the load of the fuel cells is monitored, and when operating at high or peak power, additional hydrogen may be provided to the anode flow field by virtue of venting the anode flow field either to ambient or to fuel effluent processing apparatus. At the increased reaction rate when generating high power, the proportional loss of hydrogen is less. Thus, when operating below high power levels, which is most of the time in a vehicle, a fuel cell having an unvented fuel reactant flow field will have a sufficiently high utilization of hydrogen, about 96% to 98%, to offset and exceed any loss of electrochemical efficiency which may result from the reduction in hydrogen partial pressure in the fuel flow field.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
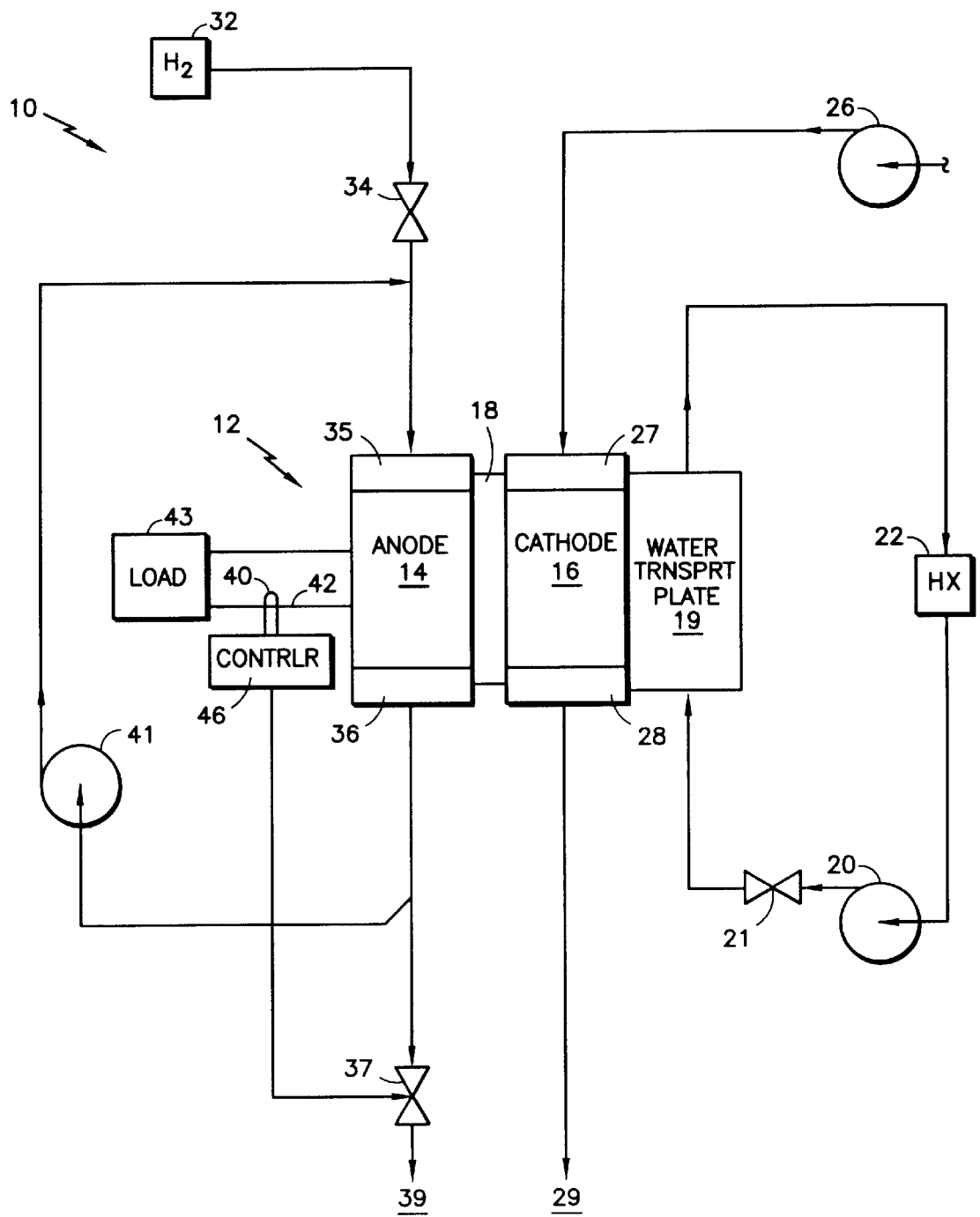
FIG. 1 is a schematic illustration of a PEM fuel cell incorporating the present invention.

Referring to FIG. 1, a fuel cell power plant 10 includes a cell stack assembly 12 which comprises a plurality of individual fuel cells stacked together in contiguous relationship, although only a single cell is illustrated in FIG. 1. A fuel cell includes an anode electrode 14, a cathode electrode 16, and a polymer electrolyte membrane 18 disposed between the electrodes. Each electrode consists of a catalyst, a porous support plate and a reactant flow field as is well known. A water transport plate 19 (or coolant plate), adjacent to the cathode 16, is connected to a coolant control loop including a coolant pump 20, a coolant pressure valve 21, and a heat exchanger 22. There may be a heat exchange bypass and other water management apparatus, not shown, as disclosed in U.S. Pat. No. 5,503,944. The pump 20 and valve 21 will regulate both the pressure and the volume of flow through the water transport plate 19 and through, or around, the heat exchanger 22. Air is supplied by a blower 26 to a cathode oxidant flow field inlet manifold 27, the depleted air exiting the flow field through an exit manifold 28 to exhaust 29. Fuel from a pressurized source 32 of hydrogen, or hydrogen rich gas, passes through a fuel pressure regulator 34, a fuel inlet manifold 35, the fuel flow field of the anode 14, and a fuel exit manifold 36 to a flow control valve 37. The valve 37, when open, vents the fuel flow field to ambient 39 (or any exhaust processor which may be used). The fuel flow field effluent passes through a recycle loop including a blower 41. The fuel recycle blower typically has a flow rate that is much greater than the fuel inlet flow rate in order to maintain a relatively uniform hydrogen composition across the anode flow field.

In the cathode oxidant flow field, some oxygen in the air is consumed by the process and a small amount of oxygen diffuses through the membrane to the anode. The oxygen concentration at the oxidant flow field inlet is about 21% and may typically be about 10% at the oxidant flow field outlet. The average concentration of nitrogen from inlet to outlet of the oxidant flow field is thus about 85%. The nitrogen diffuses through the membrane to the anode; if allowed to stabilize, the nitrogen concentration at the anode will be essentially the same as at the cathode, about 80%–85%. In accordance with the invention, the fuel cell is normally operated with the exhaust flow valve 37 closed. This results in nitrogen concentration in the recycle loop increasing until the partial pressure of nitrogen is nearly the same on both the anode and cathode sides of the membrane, which is the average concentration of nitrogen in the oxidant flow field, about 80% to 85% as previously described. This limits the hydrogen concentration in the anode flow fields to about 15% to 20%, which significantly reduces the rate of diffusion from the anode 14 across the membrane 18 to the cathode 16.

Figure 2:
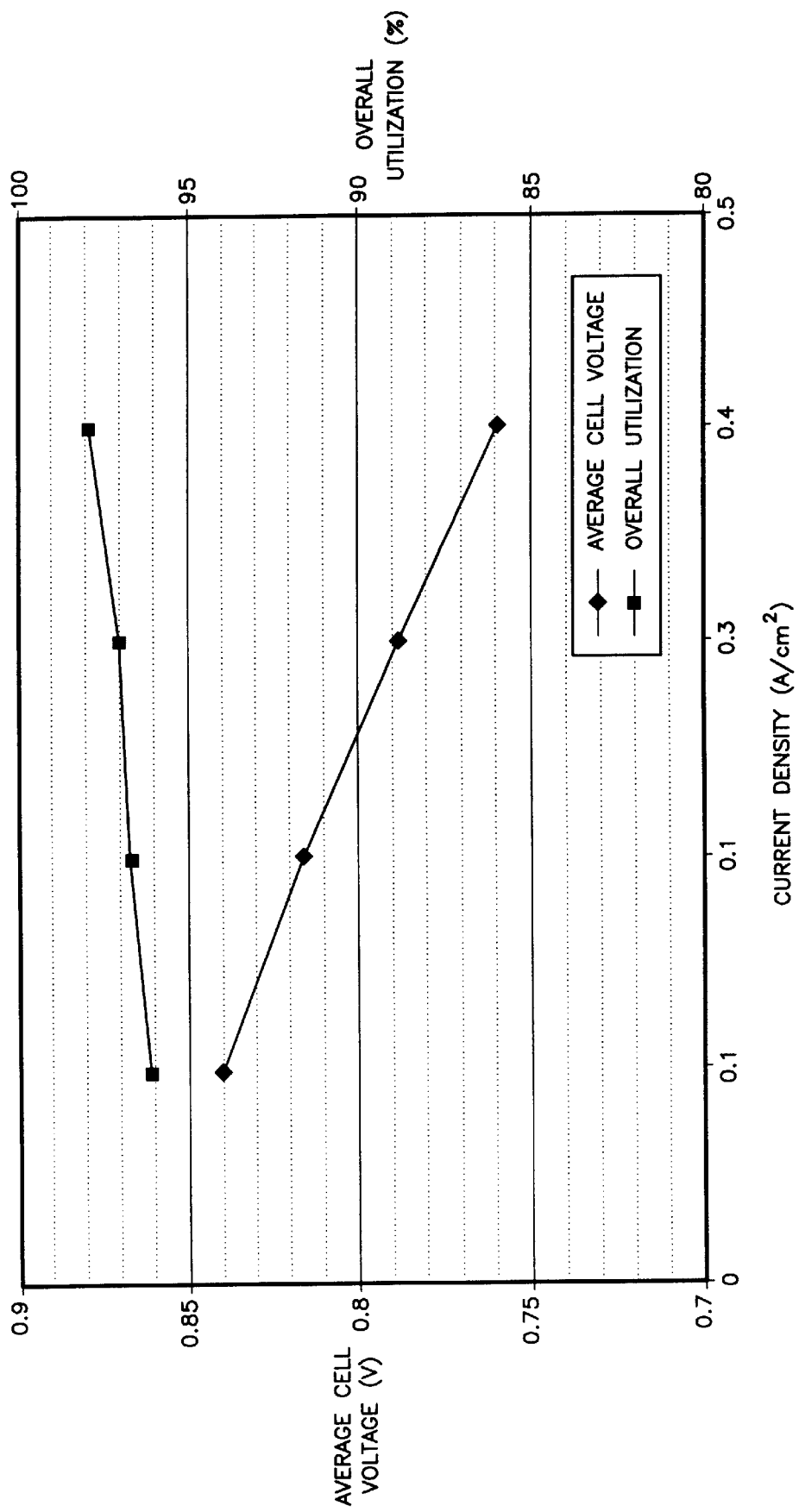
FIG. 2 is a chart of average cell voltage and overall hydrogen utilization as a function of moderate current densities with an unvented fuel flow field.

A twenty cell PEM fuel cell stack containing a 15 micron thick PEM and an active cell area of 0.4 square feet was tested at approximately 50° C. The reactants were pure hydrogen and air at nominally ambient pressure. FIG. 2 shows the current density versus average cell voltage when this stack was tested with no fuel vent and with an air utilization of 60%. FIG. 2 illustrates overall hydrogen utilization with a dead-ended flow field reaching 98% for moderate loads; the mole-fraction of hydrogen stabilizes in the mid-twenties (percent).

Figure 3:
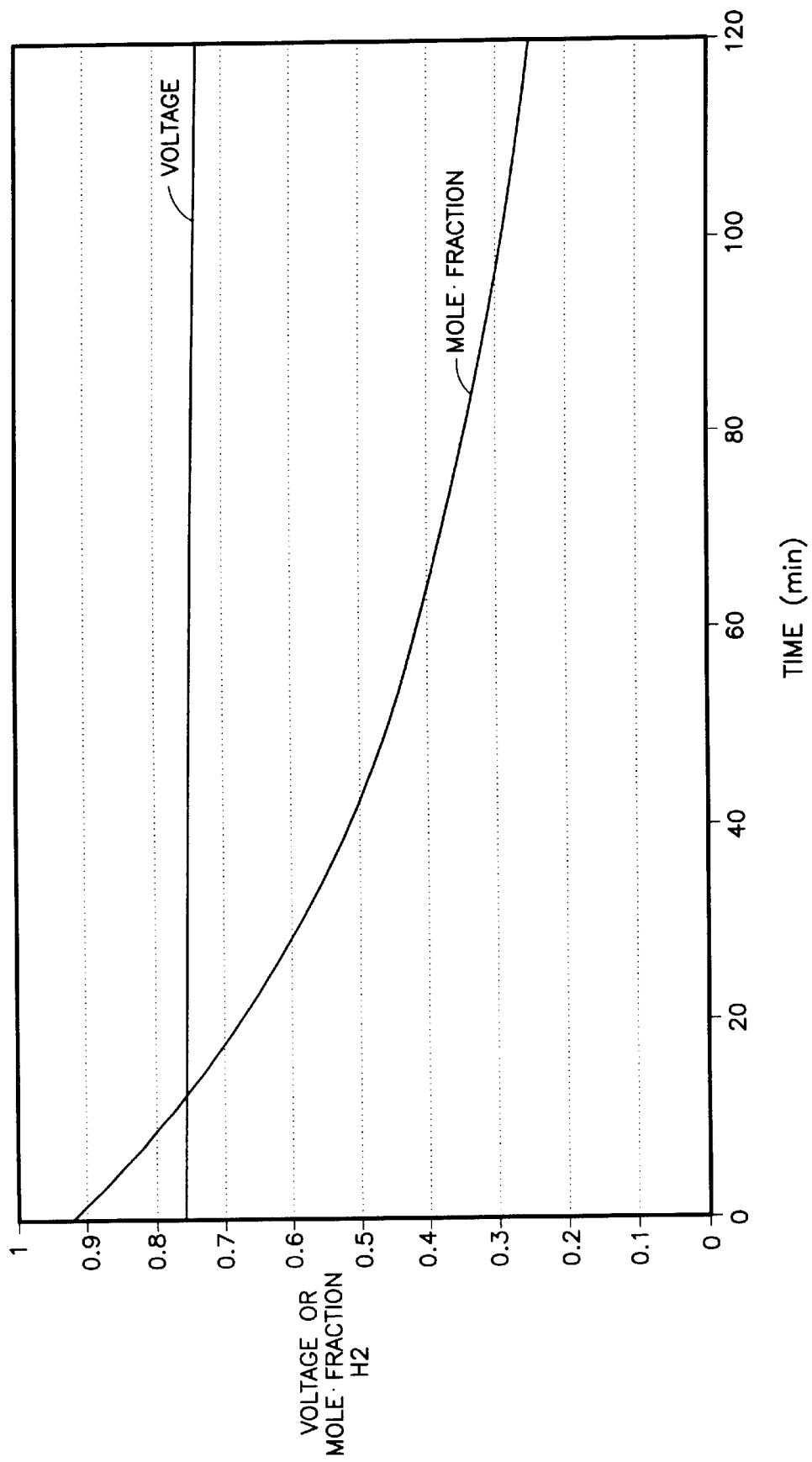
FIG. 3 is a plot of mole-fraction of hydrogen and voltage over time.

FIG. 3 shows the voltage and hydrogen concentration within the anode flow field as a function of time, at a fixed current density of 0.1 amps per square centimeter. This data shows that the hydrogen concentration decreases from an initial value of about 93% to about 27% over a period of 120 minutes with minimal effect on cell voltage. The rate of change in the hydrogen concentration versus time was much slower in the test than would be observed in a fuel cell power plant due to the extraneous volumes present in the test stand relative to a power plant.

In some fuel cells, when operating at high power, the hydrogen available to the anode catalyst may be insufficient to supply the desired load. In accordance further with the invention, a current sensor 40 senses the current in the power lines 42 feeding the load 43 of the fuel cell power plant. The sensor 40 provides a signal indicative of the load current to a controller 46 which will open the exhaust flow valve 37 when the current reaches a certain magnitude, which may be on the order of 50% to 80% of maximum rated current, and may more typically be at about 65% of maximum rated current. This will cause substantial nitrogen and some residual hydrogen to flow from the anode flow fields to ambient 39. Although not shown in the figure for clarity, the controller 46 may also adjust the setting of the hydrogen pressure control valve 34, if desired, to ensure a proper flow of hydrogen to the flow fields of the anode 14 at various current levels.

The controller 40 may also control the hydrogen exhaust flow valve 37 so as to simply purge trace contaminants periodically, such as at the start of a start up or shut down, or otherwise, as is conventional.

To maximize the advantage of the present invention, the fuel cell may also be operated at high oxygen utilization, thereby keeping the pressure of oxygen on the cathode side of the membrane low, and reducing the crossover of oxygen to the anode by diffusion. This reduces consumption of hydrogen due to crossover.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of operating a fuel cell having an anode with an unvented fuel reactant flow field, a cathode having an oxidant flow field, a proton exchange membrane between said anode and said cathode, a source of hydrogen for providing fuel to said fuel reactant flow field, a fuel recycle loop including said fuel reactant flow field and a pump for transferring effluent of said fuel reactant flow field to the inlet of said fuel reactant flow field, and means for providing air to said oxidant flow field, which method comprises:
    operating said means to provide air to said oxidant flow field;
    delivering hydrogen from said source to said fuel reactant flow field with said recycle loop unvented; and
    operating said pump;
    the concentration of nitrogen in said fuel reactant flow field, by diffusion across said membrane, reaching the average concentration of nitrogen in the oxidant flow field, thereby forcing the percent mole-fraction of hydrogen concentration in the anode flow field to be a corresponding, low complementary amount.

2. A method according to claim 1 further comprising:
    providing said fuel reactant flow field with an exhaust valve;
    measuring the current load of said fuel cell; and
    opening said exhaust flow control valve when the current load exceeds a predetermined threshold.

3. A method according to claim 2 wherein:
    said predetermined threshold is between 50% and 80% of the maximum current rating of the fuel cell.

4. A method according to claim 2 wherein:
    said predetermined threshold is about 65% of the maximum current rating of the fuel cell.

5. A method according to claim 1 further comprising:
    operating said fuel cell with hydrogen utilization in excess of a threshold magnitude of about 96%.

6. A method according to claim 1 further comprising:
    operating said fuel cell with oxygen utilization in excess of a threshold magnitude of about 70%.

7. A method according to claim 1 wherein:
    the percent mole-fraction of hydrogen concentration in the anode flow field is on the order of 15%–20%.

8. A fuel cell power plant comprising:
    a fuel cell including an anode having a fuel reactant flow field, a fuel recycle loop including said fuel reactant flow field and a pump for transferring effluent of said fuel reactant flow field to the inlet of said fuel reactant flow field, a cathode having an oxidant flow field, and a proton exchange membrane disposed between said anode and said cathode;
    means providing air to said oxidant flow field; and
    means for providing a flow of hydrogen to said fuel reactant flow field;
    wherein the improvement comprises:
        said fuel reactant flow field being unvented whereby the concentration of nitrogen in said fuel reactant flow field, as a consequence of diffusion from the oxidant reactant flow field, stabilizes at about the average concentration of nitrogen in the oxidant flow field, thereby limiting the concentration of hydrogen to a corresponding, low complementary amount.

9. A power plant according to claim 8 wherein:

said fuel reactant flow field has an exhaust flow control valve;

and further comprising:

an electrical load for said fuel cell;

means for sensing the load current provided to said electrical load and providing a current signal indicative thereof; and a controller responsive to said current signal for opening said exhaust flow control valve in response to indications of current in excess of a predetermined fraction of the maximum current load rating of said fuel cell.

10. A power plant according to claim 9 wherein said predetermined fraction is between 50% and 80%.

11. A power plant according to claim 10 wherein said predetermined fraction is about 65%.

* * * * *